L. G. YOGGERST & W. A. HUTCHISON.
DEVICE FOR DRYING SALT IN SHAKERS OR OTHER RECEPTACLES.
APPLICATION FILED OCT. 6, 1916.

1,252,872.

Patented Jan. 8, 1918.

Lawrence G. Yoggerst, INVENTORS
Walter A. Hutchison,

WITNESSES

BY

ATTORNEY

UNITED STATES PATENT OFFICE.

LAWRENCE G. YOGGERST AND WALTER A. HUTCHISON, OF SPRINGFIELD, ILLINOIS.

DEVICE FOR DRYING SALT IN SHAKERS OR OTHER RECEPTACLES.

1,252,872. Specification of Letters Patent. Patented Jan. 8, 1918.

Application filed October 6, 1916. Serial No. 124,118.

*To all whom it may concern:*

Be it known that we, LAWRENCE G. YOGGERST and WALTER A. HUTCHISON, citizens of the United States, residing at Springfield, in the county of Sangamon and State of Illinois, have invented a new and useful Device for Drying Salt in Shakers or other Receptacles, of which the following is a specification.

This invention relates to a device for drying salt in shakers or other receptacles.

The object is to provide a device for use in salt shakers or other receptacles, which is separate and independent therefrom and is adapted to be readily introduced into any ordinary form or style of shaker, for the purpose, when the same is shaken, of preventing the salt from forming into lumps or adhering to the walls of the shaker, and having means for absorbing moisture from the salt within the shaker in order to maintain the salt in a condition to pass freely through the usual perforated top when the shaker is in use.

Another object is to shape the device for this purpose in a manner to prevent the stoppage of the holes in the said perforated top when the device comes into contact therewith and also to facilitate the penetration of the body of salt by the device during the process of operating the shaker to extract the salt, so as to insure the proper action of the device in all parts of the receptacle.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the claims appended hereto.

In the drawing, in which like reference characters designate similar parts throughout the several figures:—

Figure 1:
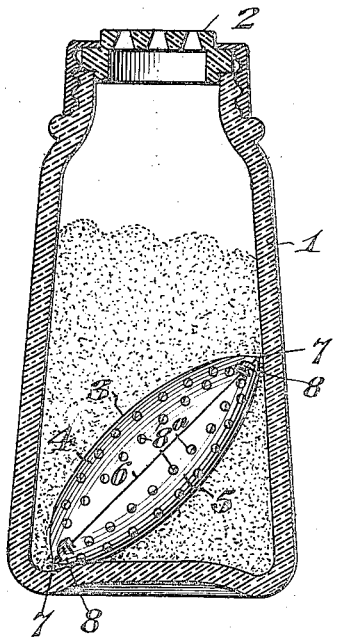
Figure 1 is a central vertical sectional view of a salt shaker of ordinary construction, having the improved device in position therein.
Figure 3:
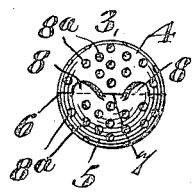
Fig. 3 is an end elevation thereof.

In the drawing there is shown in Fig. 1 an ordinary salt shaker 1, having the usual perforated top 2.

Figure 5:
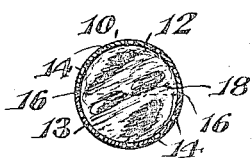
Fig. 5 is a central cross sectional view of the same.

The invention comprises a hollow elongated member 3 formed of some non-corrosive metal or other material and consisting of two similar halves or sections 4 and 5 having their meeting edges 6 along a longitudinal central plane of the device and formed to provide tapering ends 7 for a purpose to be described. The member 3 is circular in cross section, as shown in Fig. 5, and the walls of the sections 4 and 5 are perforated throughout their area as indicated at 8$^a$ to provide communication with the interior of the device.

One of the members, 5 for instance, is formed near each end 7 with a pair of lugs 8—8 which extend beyond the edge 6 and are adapted, when the section 4 is properly applied to its coacting section 5, to be bent into overlapping relation to and to be pressed inwardly against the section 5 to securely hold the two members together.

The device is filled with absorbent material 9 preferably sponge, and which may, if desired, be readily renewed by separating the sections 4 and 5 after prying open the lugs 8.

Figure 7:
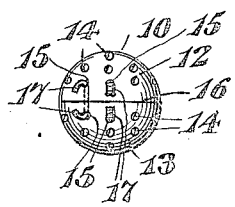
Fig. 7 is an end elevation thereof.
Figure 2:
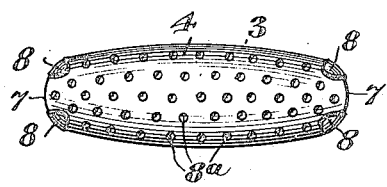
Fig. 2 is a top plan view of the device.
Figure 6:
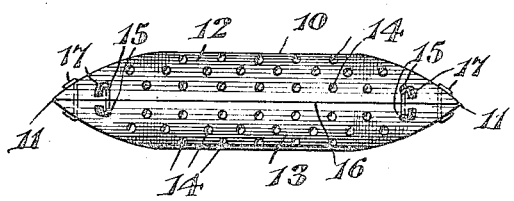
Fig. 6 is a side elevation of a slightly modified form of construction.
Figure 4:
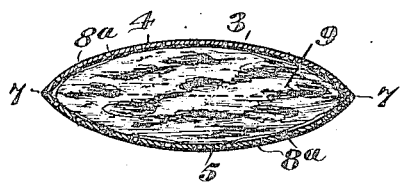
Fig. 4 is a central longitudinal sectional view.

A slightly modified form of the device is illustrated in Figs. 6 and 7, wherein the shell 10 is somewhat elongated and provided with tapering ends 11, as in the first described form, and consisting of two sections 12 and 13 having perforations 14 throughout their areas.

The sections 12 and 13 are provided with other perforations 15 located near their abutting edges 16 and adjacent to the ends 11 thereof. These perforations 15 are adapted to receive clips 17 formed of wire or other suitable material having their free ends located on the outside of the shell and bent in a direction toward each other to securely bind the sections 12 and 13 together after the shell has been packed with sponge 18 or other suitable absorbent material.

From the foregoing, it will be seen that, owing to the particular formation of the device, as illustrated in the several figures of the drawing, it may be readily introduced into the salt shaker or receptacle 1, and that the tapering ends facilitate the passage of the device through the body of salt within the container during the operation of shaking to deliver the salt therefrom. Also, when the device is inverted in use the tapering ends may strike the perforated cap 2 and rest thereon, but will not close up the neck of the container 1, nor prevent the salt from passing around the device and out through the perforations 2.

It will further be seen that by reason of the absorbent nature of the sponge or other material within the shell 1 the moisture within the salt will be absorbed therefrom through the perforations 8 or 14, thus preventing formation of lumps in the salt or the adherence thereof to the interior walls of the container 1, and that the device is free to pass back and forth throughout all parts of the container.

What is claimed is:—

1. A device adapted to be loosely confined within a receptacle, comprising an elongated hollow shell composed of two interlocked sections and having reversely tapered end portions, said shell being perforated substantially throughout its area, and a packing of sponge in the shell for absorbing moisture.

2. A device of the class described comprising a hollow elongated tubular shell composed of two like perforated sections fitted together with their meeting edges extending along the longitudinal central plane of the shell and adapted to be loosely confined within a receptacle, means for securing the sections together, and absorbent material lodged within the shell for absorbing moisture from the contents of said receptacle.

3. A device of the character described comprising a reticulated body formed with reversely tapered ends adapted to be loosely confined for free displacement within a receptacle to agitate and disintegrate the contents thereof, and a filling within the body for absorbing the moisture from the contents.

4. A device of the character described comprising a tubi-form reticulated shell formed from a plurality of sections connected with each other and adapted to be placed within a receptacle for movement with the contents of said receptacle and throughout the interior area of the latter, and means within the shell for absorbing moisture.

5. A device of the character described comprising a tubi-form reticulated shell formed from a plurality of sections connected with each other and adapted to be placed within a receptacle for movement with the contents of said receptacle and throughout the interior area of the latter, means within the shell for absorbing moisture, and means for fastening the sections together and engaged therewith adjacent to their marginal edges.

In testimony that we claim the foregoing as our own, we have hereto affixed our signatures in the presence of two witnesses.

LAWRENCE G. YOGGERST.
WALTER A. HUTCHISON.

Witnesses:
J. S. GARRETSON,
FRANK M. STEEL.